United States Patent
Otsuki et al.

(10) Patent No.: US 7,274,969 B2
(45) Date of Patent: Sep. 25, 2007

(54) CURVE INTERPOLATING METHOD

(75) Inventors: Toshiaki Otsuki, Hino (JP); Soichiro Ide, Fujiyoshida (JP); Hisashi Shiobara, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/414,170

(22) Filed: May 1, 2006

(65) Prior Publication Data

US 2006/0247820 A1 Nov. 2, 2006

(30) Foreign Application Priority Data

May 2, 2005 (JP) ............................. 2005-134029

(51) Int. Cl.
*G06F 19/00* (2006.01)
(52) U.S. Cl. ..................................... 700/189; 700/187
(58) Field of Classification Search ................ 700/189, 700/187
See application file for complete search history.

(56) References Cited

U.S. PATENT DOCUMENTS

| 6,823,234 | B2 | 11/2004 | Otsuki et al. |
| 2003/0033050 | A1* | 2/2003 | Yutkowitz ................... 700/189 |
| 2003/0120376 | A1* | 6/2003 | Shibata et al. ............... 700/189 |
| 2004/0122549 | A1* | 6/2004 | Otsuki et al. ................ 700/189 |

FOREIGN PATENT DOCUMENTS

| DE | 44 30 003 | 2/1996 |
| JP | 10-240328 | 9/1998 |
| JP | 2004-78516 | 3/2004 |

OTHER PUBLICATIONS

European Search Report and Annex dated Jul. 28, 2006 of Application No. 06 25 2015.

* cited by examiner

*Primary Examiner*—Leo Picard
*Assistant Examiner*—Steven R. Garland
(74) *Attorney, Agent, or Firm*—Staas & Halsey LLP (57) ABSTRACT

A method of generating a smooth curve to perform interpolation from a commanded sequence of points by a numerical controller for a multi-axis machine tool having three linear axes and two or more rotary axes. Corrected command points are obtained for linear axes and for rotary axes. Components of corrected command points for linear axes and corrected command points for rotary axes are synthesized with each other so as to obtain a synthesized corrected command point. A curve passing through the synthesized corrected command points is generated to perform interpolation. As a result, a more appropriate curve interpolation method for a multi-axis machine tool having two or more rotary axes can be performed.

14 Claims, 7 Drawing Sheets

```
......
......
G06.3 X100.0 Y200.0 Z300.0 A10.0 B20.0 F10000 ;   (START OF INTERPOLATION WHICH
  X101.023 Y202.512 Z311.345 A11.023 B19.876 ;     GENERATES A SMOOTH CURVE)
  X103.234 Y203.876  Z315.123 A11.987 B18.765;
......
......
G06.9 ;                              (CANCEL OF INTERPOLATION WHICH GENERATES
......                                                  A SMOOTH CURVE)
......
```

CURVE INTERPOLATING METHOD

BACKGROUND OF THE INVENTION

1. Field of the Invention

The present invention relates to a curve interpolating method which obtains a smooth curve from commanded point sequence data used when a curved surface is machined by a numerical controller or the like.

2. Description of the Related Art

In order to machine a curved surface of a mold or the like by a numerical control machine tool or the like on the basis of the commanded point sequence data created by using a CAD/CAM device, a copy grinding machine, or the like, an approximated curve is calculated from the commanded point sequence data to interpolate the curve. A line segment is formed to a target curve (hereinafter referred to as desired curve) of data created by CAD/CAM within a certain tolerance. Points of both the ends of the line segment are commanded to the numerical controller as commanded point sequence data.

Figure 1:
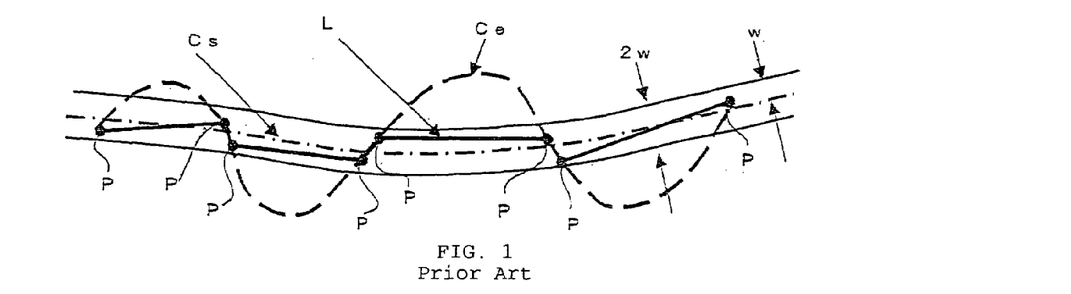
FIG. 1 is a diagram for explaining a problem in a conventional method of generating a curve on the basis of a commanded sequence of points.

As shown in FIG. 1, a line segment L is formed to a desired curve Cs within a tolerance width 2w in CAM, and points P, P . . . of both the ends of the line segment are commanded from the CAM to the numerical controller as commanded point sequence data. A curve Ce is generated on the basis of position information of the commanded sequence of points. For this reason, the curve Ce is sometimes generated to have a width larger than the tolerance width 2w with respect to the desired curve Cs.

A method of correcting command points is also known (see Japanese Patent Application Laid-Open No. 10-240328). However, in this correction, it is not certain that a curve Ce having a width larger than the tolerance width 2w with respect to the desired curve Cs is not generated.

Figure 2:
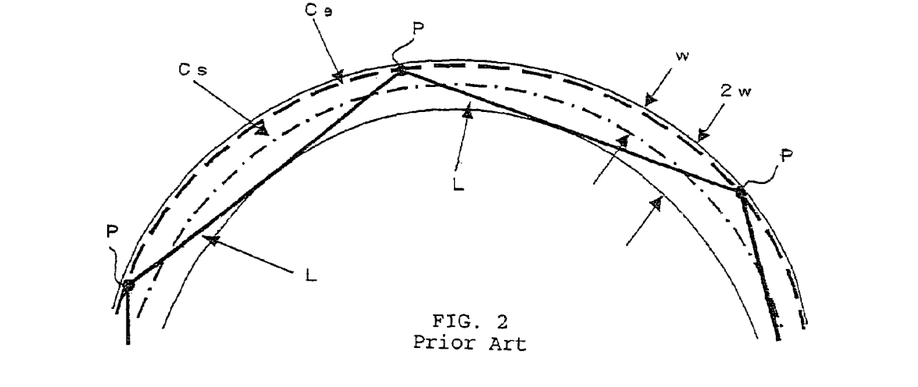
FIG. 2 is a diagram for explaining a curve generated by the conventional method and a desired curve.
Figure 3:
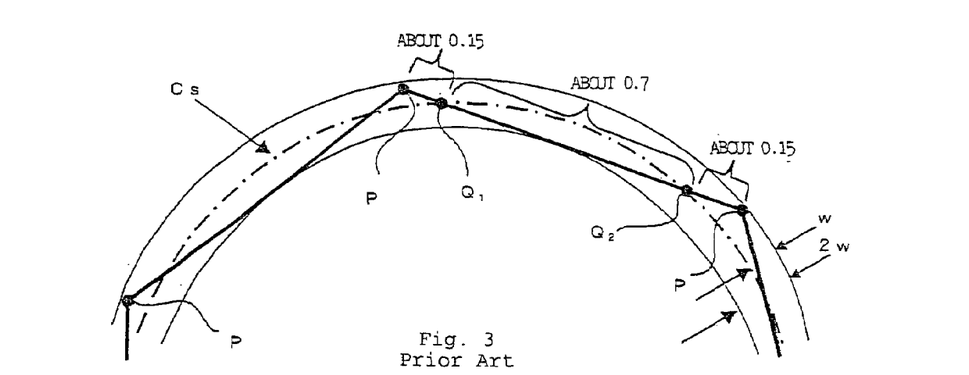
FIG. 3 is a diagram for explaining points on the desired curve obtained by the conventional method.

A commanded sequence of points is frequently located at an end of a band having the certain tolerance width 2w with respect to the desired curve Cs. For this reason, when the curve Ce is generated from only a commanded sequence of points, the curve Ce may depart from the desired curve Cs. For example, as shown in FIG. 2, it is assumed that the desired curve Cs is an arc. In this case, when a line segment L falling within the tolerance width 2w is generated, the command points P are located at positions spaced apart from the desired curve Cs by a tolerance value w. As shown in FIG. 3, two points Q1 and Q2 which internally divide each line segment L such that the lengths have a ratio of about 0.15:0.7:0.15 are points which exist on the desired curve Cs.

This is true when command points are corrected. For example, as shown in FIG. 2 described above, when the desired curve Cs is arc, the commanded sequence of points P, P, . . . are arranged on the arc. For this reason, even if an approximate curve Ce is assigned to the commanded sequence of points, a commanded sequence of points is rarely corrected. Therefore, the corrected commanded sequence of points is spaced apart from the desired curve Cs by the tolerance value w after all.

Figure 4:
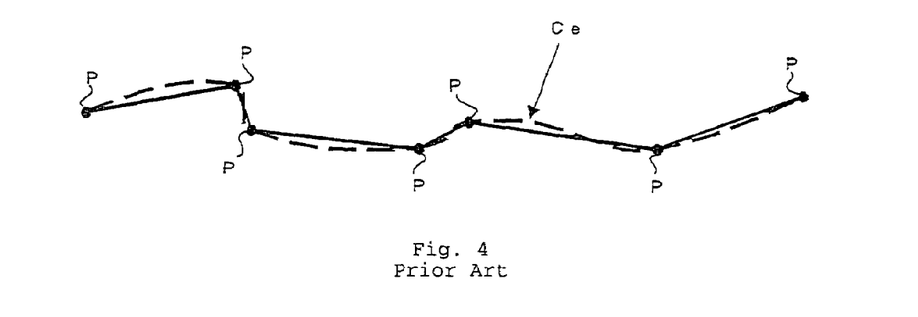
FIG. 4 is a diagram for explaining an example in which a smooth curve cannot be generated by the conventional method dependent on commanded sequence of points.

The curve Ce generated from the commanded sequence of points necessarily passes through the position of the commanded sequence of points. For this reason, in case where the commanded sequence of points has a calculation error in CAD/CAM or a rounding error to a set unit to obtain a sequence of points P, P, P . . . as shown in FIG. 4. In this case the error is reflected on the generated curve Ce, with the result that surface accuracy of a machined surface is poor, or vibration of the machine in machining is caused. In this manner, the fact that the curve Ce always passes through the position of the commanded sequence of points can be a cause of deterioration of surface accuracy.

In order to solve these problems, the following curve interpolating method is known (see Japanese Patent Application Laid-Open No. 2004-78516). That is, an interpolation point which interpolates commanded point sequence data created by using a CAD/CAM device, a copy grinding machine, or the like is calculated, and an approximated curve is calculated from the interpolation point. Correction points obtained by correcting interpolation points at a density higher than a set unit of a point sequence command toward the approximated curve are calculated, and a smooth curve having a width not larger than a tolerance width which passes through the sequence of the corrected points is formed to interpolate the curve.

In the curve interpolating method described in the above Japanese Patent Application Laid-Open No. 2004-78516, a smooth curve which falls within a tolerance width is obtained from a commanded sequence of points to interpolate the curve. The curve interpolating method equally handles axes of a machine tool. In the curve interpolating method, interpolation points are calculated from commanded point sequence data to calculate an approximated curve without discriminating a linear axis from a rotary axis, and correction points corresponding to the interpolation points are calculated on the basis of the approximated curve to calculate a curve passing through a point sequence of the correction points. However, as the linear axis has unit of length, while a rotary axis has unit of angle, the linear axis and the rotary axis have different dimensions. Therefore, the curve interpolating method described in the above Patent Document is not always sufficient to be applied to a machine tool having a rotary axis.

SUMMARY OF THE INVENTION

The present invention relates to a method of generating a smooth curve from a commanded sequence of points by a numerical controller for a multi-axis machine tool having three linear axes and two or more rotary axes to perform interpolation along the generated curve. The method comprises:

(1) the step of calculating interpolation points between points of a commanded sequence of points and setting the calculated interpolation points as geometrical command points;

(2) the step of noticing respective points of the geometrical command points one by one so as to select a noticed point and geometrical command points located before and behind the noticed point and the number of which has been decided in advance;

(3) the step of resolving each of the geometrical command points into component of three linear axes and component of two or more rotary axes;

(4) the step of generating an approximated curve for linear axes with regard to the component of three linear axes;

(5) the step of moving the component of three linear axes toward the approximated curve for linear axes so as to obtain corrected command point for linear axes;

(6) the step of generating an approximated curve for rotary axes with regard to the component of two or more rotary axes;

(7) the step of moving the component of two or more rotary axes toward the approximated curve for rotary axes so as to obtain corrected command point for rotary axes;

(8) the step of synthesizing the component of three linear axes of the corrected command point for linear axes which has been moved and the component of two or more rotary axes of the corrected command points for rotary axes which has been moved so as to obtain a synthesized corrected command point;

(9) the step of repeatedly executing the above steps (2) to (8) with regard to the respective geometrical command points;

(10) the step of generating a curve passing through a point sequence of the synthesized corrected command points; and (11) the step of interpolating the generated curve.

The method may employ the following aspects.

In the step (1), the interpolation point and the command point may be collectively set as geometrical command points.

In the step (1), interpolation points may be calculated at a density higher than a set unit of point sequence command, when carrying out interpolation.

In the steps (4) and (6), an approximated curve may be generated such that a sum of squares of distances between respective points and the approximated curve is minimum.

In steps (5) and (7), when a movement amount for correction exceeds a first set value, the movement amount for correction may be only the first set value.

In the steps (5) and (7), when a distance between corrected command points is smaller than a second set value, an interpolation point between the corrected command points may be set as a corrected command point, and the corrected command points used for calculating the interpolation point may be deleted. The calculated interpolation point may be a median point.

In the steps (5) and (7), the components may be moved at a density higher than a set unit of point sequence command.

In step (10), when generating a curve passing through the synthesized correction commanded sequence of points, a synthesized first-order derivative value is used. In this case, the synthesized first-order derivative value is obtained by calculating, for each corrected command points, first-order derivative values of an approximated curve at the points on the approximated curve to which respective corrected command points on the approximated curve for linear axes and the approximated curve for rotary axes correspond, and synthesizing the calculated first-order derivative values.

In the step (11), interpolation may be performed at a density higher than a set unit of point sequence command.

In the step (1), when a distance between command points is smaller than a certain set value, an interpolation point between the command points may be regarded as a command point, and the command points used for calculating the interpolation point may be deleted. The calculated interpolation point may be a median point.

In the steps (4) and (6), a curve to be generated may be an NURBS curve or a spline curve.

According to the present invention, corrected command points are obtained for components of linear axes and components for rotary axes, which have different dimensions respectively, the component of corrected command point for linear axes and the component of corrected command point for rotary axes, which are obtained separately, are synthesized to calculate synthesized corrected command points, and a curve passing through the synthesized corrected command points is generated to perform interpolation. For this reason, an appropriate curve interpolation in a multi-axis machine tool having two or more rotary axes can be performed.

BRIEF DESCRIPTION OF THE DRAWINGS

The above and other objects and characteristic features of the present invention will be apparent from the following description of embodiments with reference to the accompanying drawings. Of these drawings.

DETAILED DESCRIPTION OF THE PREFERRED EMBODIMENTS

Figure 5:
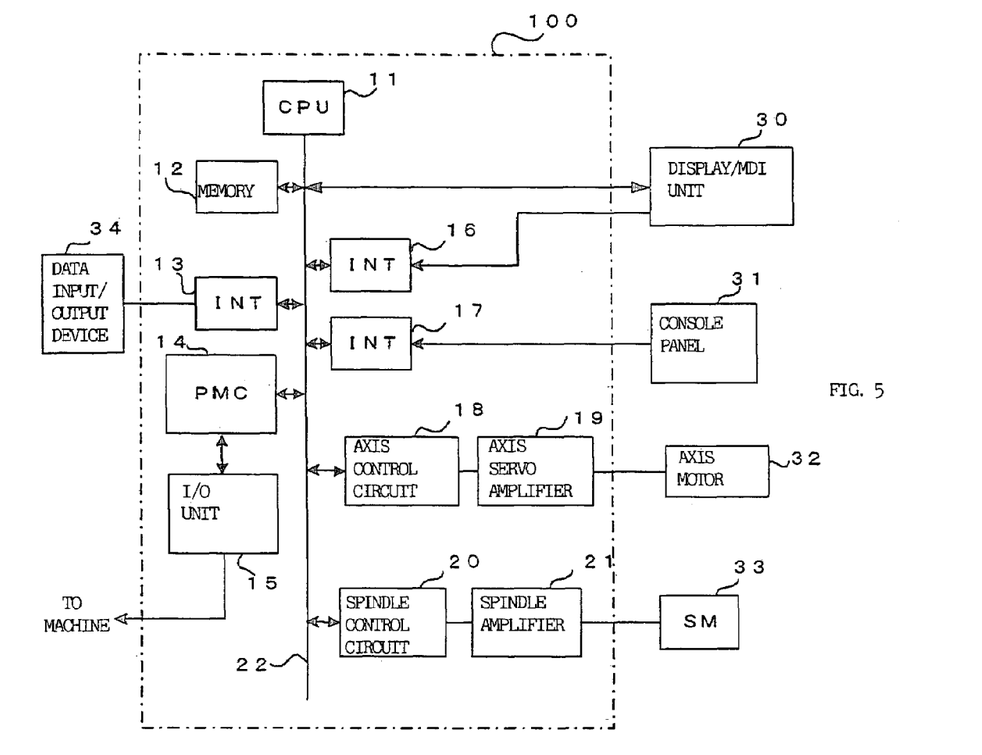
FIG. 5 is a main block diagram of an embodiment of a numerical controller which executes a method according to the present invention.

FIG. 5 is a block diagram of a numerical controller 100 to which a curve interpolating method according to the present invention is applied. To a processor 11 which entirely controls the numerical controller 100, a memory 12 such as a ROM, a RAM, or a CMOS memory backed up by a battery, an interface 13 to which a data input/output device 34 for inputting/outputting data to/from a storage medium is connected, an interface 16 to which a display/MDI unit 30 is connected, an interface 17 to which a console panel 31 is connected, a PMC (programmable machine controller) 14, the display/MDI unit 30, axis control circuits 18 for respective axes, and a spindle control circuit 20 are connected by a bus 22.

In the embodiment, it is assumed that a 5-axis machine tool is controlled by the numerical controller 100 and has three linear axes consisting of an X axis, a Y axis, and a Z axis and rotary axes consisting of an A axis and a B axis. The axis control circuit 18 for the five axes receives a moving command values of the respective axes from the processor 11 to output commands of the respective axes to a servo amplifier 19. The servo amplifier 19 receives the commands to drive servo motors 32 of the respective axes. The servo motor 32 of each axis incorporates a position/speed detector, and feeds back a position/speed feedback signal from the position/speed detector to the axis control circuit 18 to perform feedback control of a position/speed. In FIG. 5, a position/speed feedback operation is omitted.

The spindle control circuit 20 receives a spindle rotation command to output a spindle speed signal to a spindle amplifier 21 by a command spindle speed and a speed feedback signal from a position encoder arranged in a spindle motor 33. The spindle amplifier 21 controls the speed of the spindle by the spindle speed signal.

Figure 6:
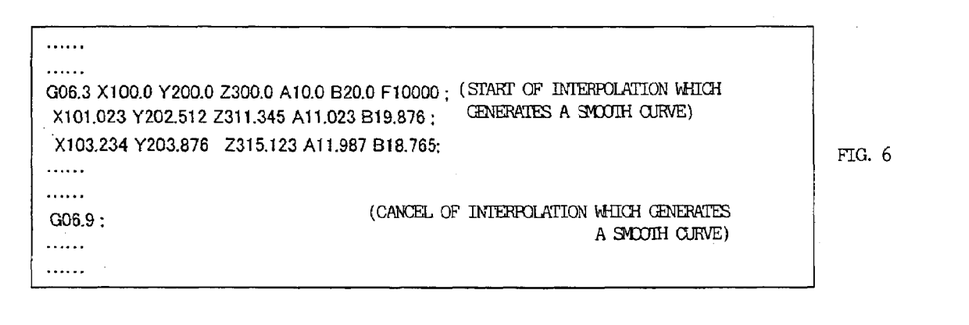
FIG. 6 is a diagram for explaining an example of a program which is commanded to the numerical controller in FIG. 5 to generate a curve and to interpolate the curve.

It is assumed that a machining program including commanded point sequence data created by using a CAD/CAM device, a copy grinding machine, or the like is input from the data input/output device 34 through the interface 13 and stored in a nonvolatile part of the memory. A G code which commands the device to generate a smooth curve and to start interpolation and a G code which cancels the command are prepared. In a machining program, as shown in FIG. 6, a G code "G06.3" of a smooth curve interpolation command is included at the start of a commanded sequence of points with which a smooth curve and which is to be interpolated, and G code "G06.9" of a smooth curve interpolation cancel command is included at a position where the command is canceled. Between the G codes "G06.3" and "G06.9", smooth interpolation employed by the present invention is performed for moving commands to the X, Y, Z, A, and B axes.

Figure 7:
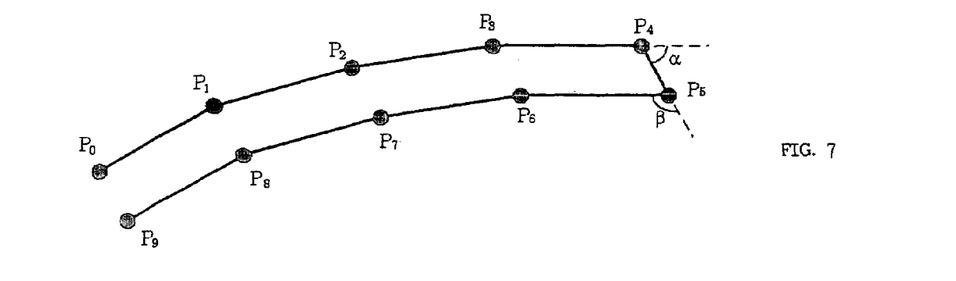
FIG. 7 is a diagram for explaining a method of automatically determining whether a curve is generated and interpolated in the embodiment of the present invention.

A section in which the smooth interpolation is performed may be automatically determined by the positions of linear axes on sequence of points. In this case, the processor 11 reads sequence of points from the machining program and automatically determines whether or not interpolation is to be performed by generating a smooth curve from an angle and a length of a line segment connecting points on the sequence of points. As shown in FIG. 7, a refractive angle between adjacent line segments between points $P_1$, $P_2$, and $P_3$ is small. A refractive angle between adjacent line segments between points $P_6$, $P_7$, and $P_8$ is also small.

Therefore, it is determined that these sections are regions in which a smooth curve is generated and interpolated, refractive angles α of a line segment between the points $P_3$ and $P_4$ and a line segment between the points $P_4$ and $P_5$ and refractive angles β of the line segment between the points $P_4$ and $P_5$ and a line segment between the points $P_5$ and $P_6$ are large. For this reason, a process of generating a smooth curve and interpolating the curve is not performed between the points $P_4$ and the $P_5$. More specifically, when the refractive angles of adjacent line segments between commanded point sequences are equal to or smaller than a reference value, it is automatically determined that a process of generating a smooth curve and interpolating the smooth curve is performed. When the refractive angles are larger than the reference value, it is automatically determined that the process is not performed.

Figure 8:
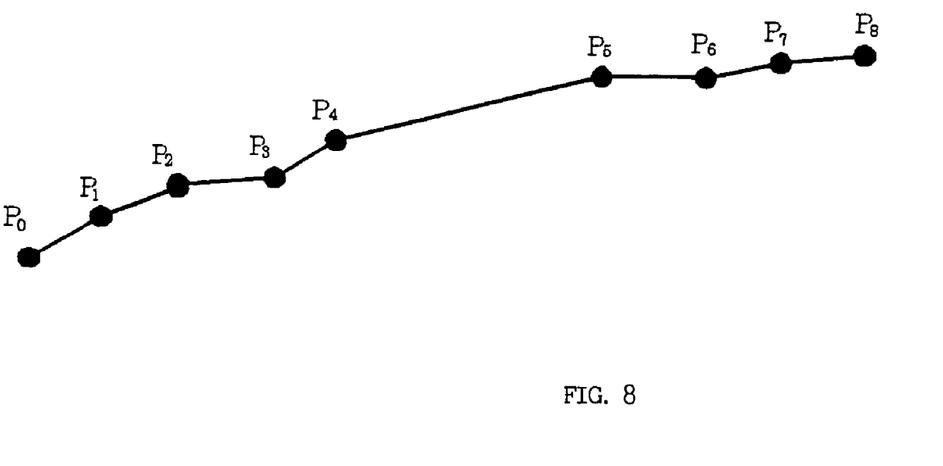
FIG. 8 is a diagram for explaining a method of automatically determining whether a curve is generated and interpolated in the embodiment of the present invention.

As shown in FIG. 8, although a distance between the command point $P_1$ and the command point $P_4$ and a distance between the command point $P_5$ and the command point $P_8$ are short, a distance between the command point $P_4$ and the command point $P_5$ is long. In the case of the command points $P_0$ to $P_4$ and $P_5$ to $P_8$ which are equal to or smaller than a reference value, it is automatically determined that a process of generating a smooth curve and interpolating the smooth curve is performed. In the case of the command points $P_4$ to $P_5$ which are larger than the reference value, it is automatically determined that the process of generating a smooth curve and interpolating the curve is not performed.

Figure 9:
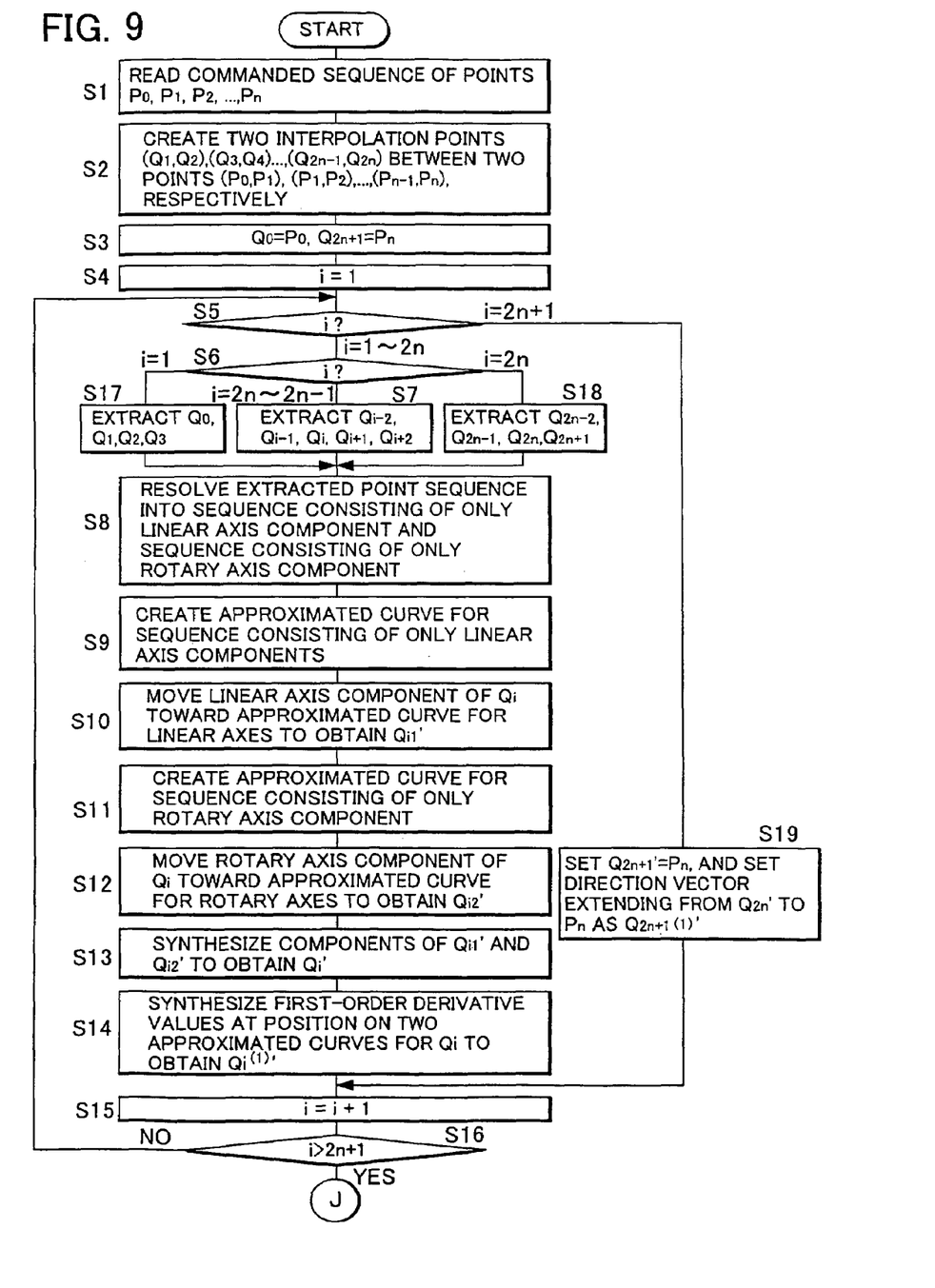
FIG. 9 is a flow chart of a process of executing the embodiment of the present invention.
Figure 10:
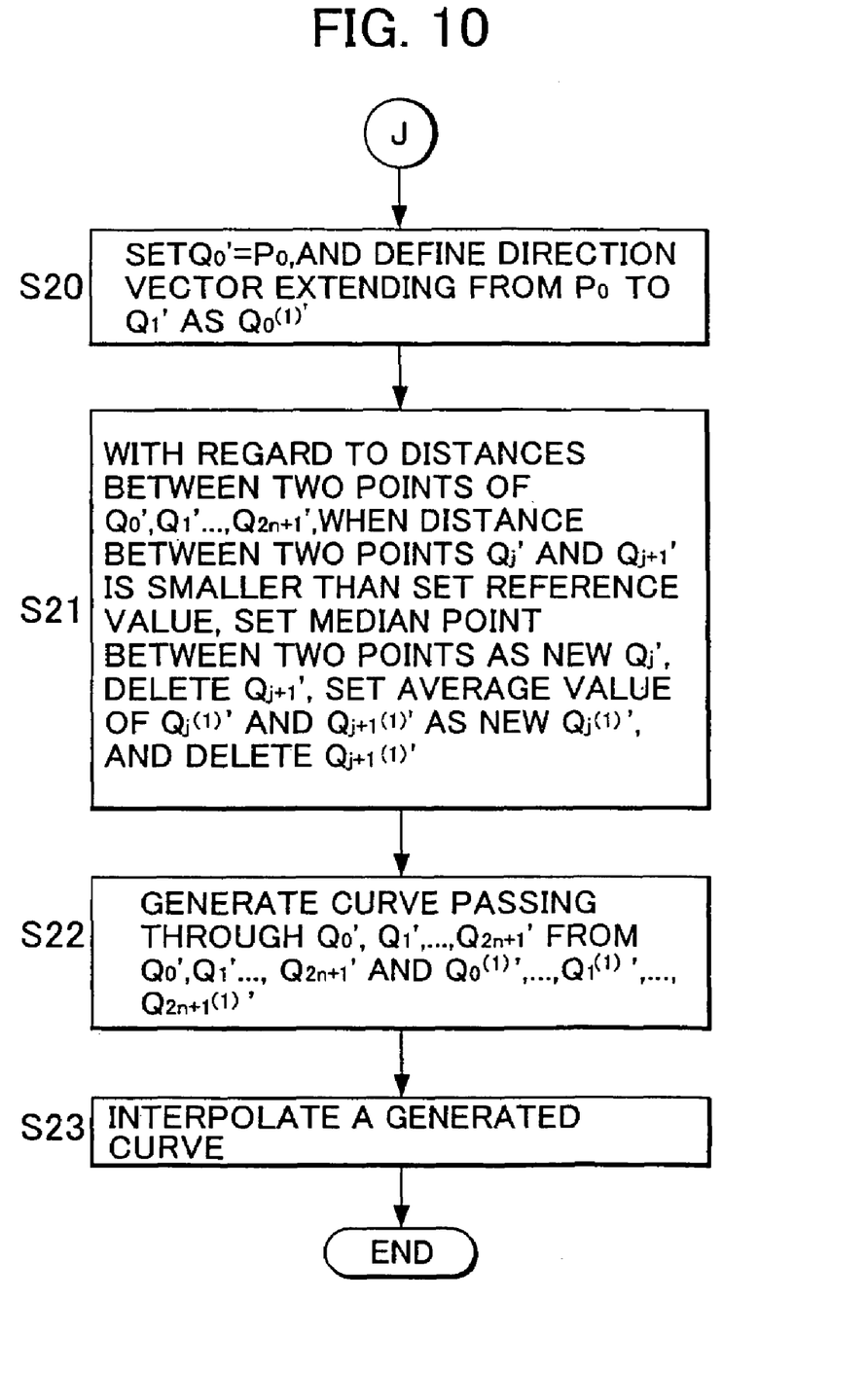
FIG. 10 is a flow chart subsequent to the flow chart in FIG. 9.

A process performed when determined that a smooth curve is generated automatically or by a G code to interpolate the smooth curve will be described below with reference to the flow charts shown in FIGS. 9 and 10.

Figure 11:
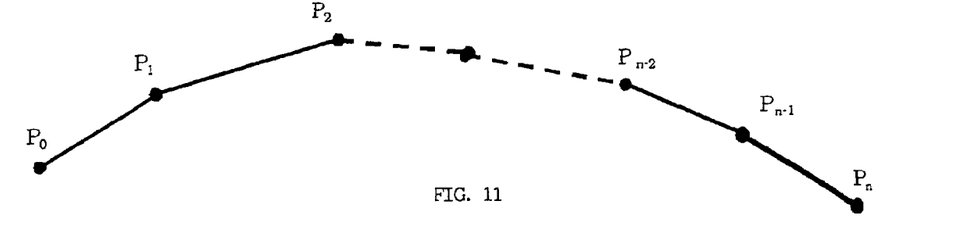
FIG. 11 is a diagram for explaining a point sequence command.

The processor 11 reads the commanded sequence of points $P_0$, $P_1$, $P_2$, . . . , $P_{n-1}$, $P_n$ from a machining program (S1). It is assumed that the read commanded sequence of points are $P_0$, $P_1$, $P_2$, . . . , $P_{n-1}$, $P_n$, as shown in FIG. 11.

Figure 12:
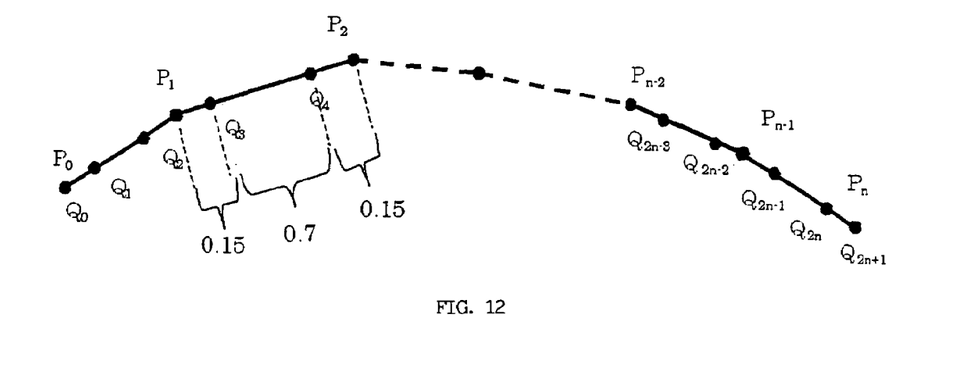
FIG. 12 is a diagram for explaining how interpolation points (geometrical command points) are calculated according to the embodiment of the present invention.

Interpolation points $(Q_1,Q_2)$, $(Q_3,Q_4)$, . . . , $(Q_{2n-1},Q_{2n})$ between two points are created at a density higher than a set unit of a point sequence command between respective points $(P_0, P_1)$, $(P_1, P_2)$, . . . , $(P_{n-1}, P_n)$ (S2). In the embodiment, as shown in FIG. 12, points $Q_{2i+1}$ and $Q_{2i+2}$ are created between the point $P_i$ and the point $P_{i+1}$ such that an interpolation ratio is 0.15:0.7:0.15. More specifically, a ratio (interpolation ratio) of the lengths of a line segment $P_i$–$Q_{2i+1}$, a line segment $Q_{2i+1}$–$Q_{2i+2}$, and a line segment $Q_{2i+2}$–$P_{i+1}$ is 0.15:0.7:0.15.

$Q_0=P_0$ and $Q_{2n+1}=P_n$ are set (S3). Accordingly, a geometrical command sequence of points constituted by sequence of points $Q_0$, $Q_1$, $Q_2$, . . . , $Q_{2n}$, $Q_{2n+1}$ of the interpolation points are generated.

"1" is set in an index i (S4), and the value of the index i is determined (S5 and S6). When the index i is "1", geometrical command sequence of points $Q_{i-1}$, $Q_i$, $Q_{i+1}$, $Q_{i+2}$ ($Q_0$, $Q_1$, $Q_2$, and $Q_3$) are extracted (S17). When the index i is 2 to 2n–1, geometrical command sequence of points $Q_{i-2}$, $Q_{i-1}$, $Q_i$, $Q_{i+1}$, and $Q_{i+2}$ are extracted (S7). When the index i is 2n, geometrical command sequence of points $Q_{i-2}$, $Q_{i-1}$, $Q_i$, and $Q_{i+1}$ (=$Q_{2n-2}$, $Q_{2n-1}$, $Q_{2n}$, and $Q_{2n+1}$) are extracted (S18). The case where the index i is 2n+1 is explained below.

The extracted sequence of points is resolved into a sequence consisting of only linear axis components (components of an X axis, a Y axis and a Z axis) and a sequence consisting of only rotary axis components (components of an A axis and a B axis) (S8).

An approximated curve for linear axes Cm1 is created by a least-square method for the obtained sequence consisting of only the linear axis components. More specifically, the curve Cm1 is created such that a sum of squares of distances between the curve Cm1 and the extracted sequence of points is minimum (S9). It is assumed that the approximated curve for linear axes Cm1 is a curve indicated by an alternate long and short dash line shown in FIG. 13.

Figure 13:
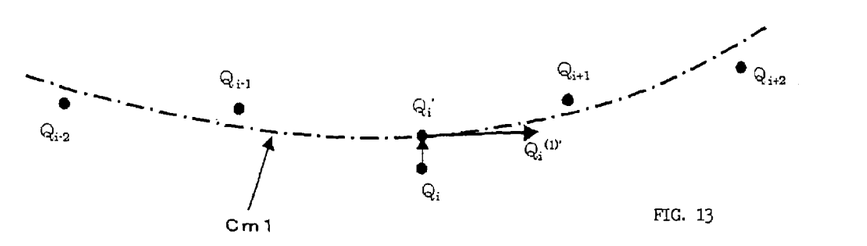
FIG. 13 is a diagram for explaining how an approximated curve is calculated to calculate a corrected command point and a first-order derivative value, according to the embodiment of the present invention.

A point of the linear axis component of the geometrical command point $Q_i$ corresponding to the index i at this point of time is moved toward the approximated curve for linear axes Cm1 at a density higher than a unit of point sequence command within a tolerance value 2w, so that a corrected command point $Q_{i1}'$ consisting of only linear axes is obtained (S10).

Similarly, an approximated curve for rotary axes Cm2 is created by a least-square method for the sequence consisting of only the rotary axis components (S1). A point of the rotary axis component of the geometrical command point $Q_i$ corresponding to the index i at this point of time is moved toward the approximated curve for rotary axes Cm2 at a density higher than the set unit of point sequence command within the tolerance value $2w$. A corrected command point $Q_{i2}'$ consisting of only rotary axes is obtained (S12).

The corrected command point for linear axes $Q_{i1}'$ and the corrected command point for rotary axes $Q_{i2}'$ are synthesized with each other to obtain a synthesized corrected command point $Q_i'$ (S13). Furthermore, first-order derivative values at positions on the approximated curve for linear axes Cm1 and the approximated curve for rotary axes Cm2 corresponding to the geometrical command point $Q_i$ are calculated and synthesized with each other. The resultant value is stored as a first-order derivative value $Q_i^{(1)'}$ (S14).

The index i is incremented by "1" (S15). It is determined whether or not the index i exceeds the number "2n+1" of geometrical command points Q (S16). When the index i does not exceed the number, the program returns to step S5 to execute the processes described above.

When it is determined in the process in step S5 that the index has reached "2n+1", the synthesized corrected command point $Q_{2n+1}'$=command point $P_n$ is set, a direction vector extending from the synthesized corrected command point $Q_{2n}'$ to the command point $P_n$ is stored as the first-order derivative value $Q_{2n+1}^{(1)'}$ corresponding to the synthesized corrected command point $Q_{2n+1}'$ (S19), and the index i is incremented by 1 (S15). As a result, it is determined that the index i has exceeded the number "2n+1" of geometrical command points Q (S16). For this reason, the program shifts to the process in step S20, synthesized corrected command point $Q_0'$ command point $P_0$ is set, and a direction vector extending from the command point $P_0$ to the synthesized corrected command point $Q_1'$ is set as the first-order derivative value $Q_0^{(1)'}$ corresponding to the synthesized corrected command point $Q_0'$ (=$P_0$) (S20).

With the above processes, the synthesized correction commanded sequence of points $Q_0', Q_1', Q_2', \ldots, Q_{2n}', Q_{2n+1}'$ corresponding to the geometrical command sequence of points $Q_0, Q_1, Q_2, \ldots, Q_{2n}, Q_{2n+1}$ and first-order derivative values $Q_0^{(1)'}, Q_1^{(1)'}, Q_2^{(1)'}, \ldots Q_{2n}^{(1)'}, Q_{2n+1}^{(1)'}$ of each synthesized corrected command point are obtained.

Figure 14:
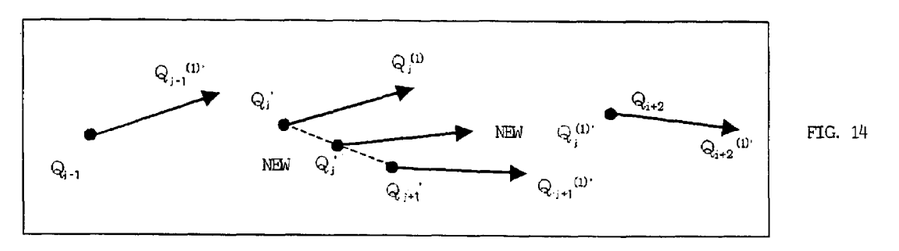
FIG. 14 is a diagram for explaining how corrected command points are further corrected to obtain new corrected command points and a first-order derivative value, according to the embodiment of the present invention.

Furthermore, in the embodiment, as shown in FIG. 14, when, of the synthesized correction commanded sequence of points $Q_0', Q_1', Q_2', \ldots, Q_{2n}', Q_{2n+1}'$, a distance between two adjacent points ($Q_j'$ and $Q_{j+1}'$) is shorter than a preset reference value, an interpolation point interpolated between the two points $Q_j'$ and $Q_{j+1}'$ is calculated. In the example shown in FIG. 14, an median point between the two points is defined as a new synthesized corrected command point $Q_j'$, and the old synthesized corrected command points $Q_j'$ and $Q_{j+1}'$ are deleted. An average value of the first-order derivative values $Q_j^{(1)'}$ and $Q_{j+1}^{(1)'}$ of the old synthesized corrected command points is defined as a first-order derivative value $Q_j^{(1)'}$ of the new synthesized corrected command point $Q_j'$, and the first-order derivative values $Q_j^{(1)'}$ and $Q_{j+1}^{(1)'}$ of the old synthesized corrected command points are deleted. The synthesized corrected command points $Q_0'$ and $Q_{2n+1}'$ at both the ends of the synthesized correction commanded sequence of points and the first-order derivative values $Q_0^{(1)'}$ and $Q_{2n+1}^{(1)'}$ of these synthesized corrected command points are not deleted.

In this manner, as original data for generating a curve, the synthesized correction commanded sequence of points $Q_0', Q_1', \ldots, Q_{2n+1}'$ and first-order derivative values $Q_0^{(1)'}, Q_1^{(1)'}, \ldots, Q_{2n+1}^{(1)'}$ at these points are created (S21).

From the synthesized correction commanded sequence of points $Q_0', Q_1', \ldots, Q_{2n+1}'$ and the first-order derivative values $Q_0^{(1)'}, Q_1^{(1)'}, \ldots, Q_{2n+1}^{(1)'}$, a curve passing through the synthesized correction commanded sequence of points $Q_0', Q_1', \ldots, Q_{2n+1}'$ is generated (S22).

For example, with respect to the two adjacent synthesized correction command values $Q_j'$ and $Q_{j+1}'$, positions $Q_j'$ and $Q_{j+1}'$ thereof and first-order derivative values $Q_j^{(1)'}$ and $Q_{j+1}^{(1)'}$ at these points are given. For this reason, a cubic curve such as a spline curve or an NURBS curve which connects these points is generated to make it possible to interpolate the curve. More specifically, for example, when the two points $Q_j'$ and $Q_{j+1}'$ are connected to each other by a cubic curve such as the following spline curve, four data, i.e., the positions $Q_j'$ and $Q_{j+1}'$ of the two points and the first-order derivative values $Q_j^{(1)'}$ and $Q_{j+1}^{(1)'}$ are given. For this reason, coefficients A, B, C, and D of a spline curve given by the following equation are determined, and a cubic curve Ce which connects the two points $Q_j'$ and $Q_{j+1}'$ is generated (S23).

$$f(t) = At^3 + Bt^2 + Ct + D$$

(A, B, C, and D are coefficients, and t=curve parameter of 0 to 1.0).

where f (t), A, B, C, and D are vectors having the following values for respective axes:

$$f(x)_x = A_x t^3 + B_x t^2 + C_x t + D_x$$

$$f(x)_y = A_y t^3 + B_y t^2 + C_y t + D_y$$

$$f(x)_z = A_z t^3 + B_z t^2 + C_z t + D_z$$

$$f(x)_a = A_a t^3 + B_a t^2 + C_a t + D_a$$

$$f(x)_b = A_b t^3 + B_b t^2 + C_b t + D_b$$

Figure 16:
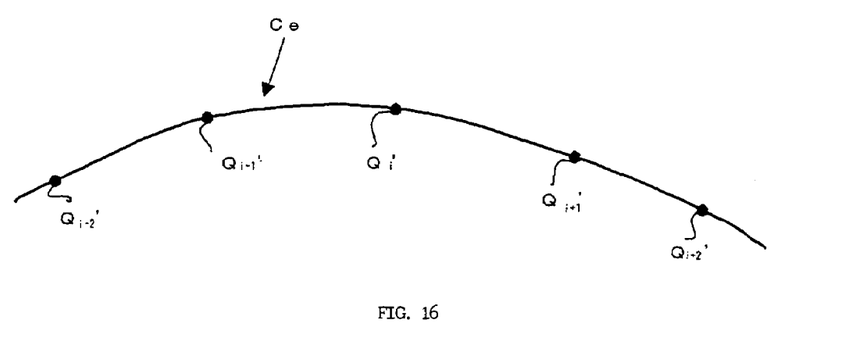
FIG. 16 is a diagram for explaining a smooth curve to be generated according to the embodiment of the present invention.

A curve Ce generated in this manner is shown in FIG. 16.

The curve Ce generated as described above is interpolated at a density higher than the set unit of point sequence command (S20).

In the embodiment, the process is started after all the commanded sequence of points $P_0, P_1, P_2, \ldots, P_{n-1}, P_n$ are read in step S1. However, only a necessary part of sequence of points can also be read to start the process of the part of the sequence. In this manner, the process of generating a curve need not be started after all target commanded sequence of points are read, and it is possible to generate a curve for a commanded sequence of points which has been read, during reading of commanded sequence of points.

In order to obtain interpolation points (=geometrical command points) between command points, in the embodiment, two interpolation points are created. However, the number of interpolation points are not limited to two. That is, one interpolation point or three or more interpolation points may be created. Furthermore, when an approximated curve Cm is to be created, in the embodiment, up to two geometrical command points are extracted before and behind a noticed geometrical command point. However, the number of points may be a number other than two. Furthermore, the commanded sequence of points $P_0, P_1, P_2, \ldots, P_{n-1}, P_n$ and the interpolation points $Q_1, Q_2, \ldots, Q_{2n}$ may be collectively set as geometrical command points.

Figure 15:
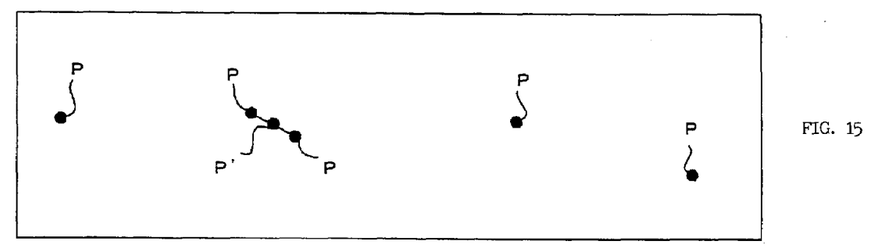
FIG. 15 is a diagram for explaining a case in which the command points are further corrected according to the embodiment of the present invention.

Furthermore, when a line segment which connects two arbitrary points of the commanded sequence of points $P_0, P_1, P_2, \ldots, P_{n-1}, P_n$ is shorter than a certain set value, as shown in FIG. 15, the interpolation point or the median point between the two points may be regarded as a command point P', and the two command points used for generating the interpolation point or the median point may be deleted.

In this case, it is determined in the process in step S2 whether or not a distance between the command points P is not more than a set reference value. When the distance is equal to or shorter than the reference value, the above process may be performed to recreate commanded sequence of points to calculate an interpolation point.

In the embodiment, interpolation points $Q_{2i+1}$ and $Q_{2i+2}$ are formed between the command points $P_i$ and $P_{i+1}$ in the process in step S2, and a ratio of lengths of the line segment $P_i$–$Q_{2i+1}$, the line segment $Q_{2i+1}$–$Q_{2i+2}$, and the line segment $Q_{2i+2}$–$P_{i+1}$ is given by 0.15:0.7:0.15. However, another ratio may be used.

In the above embodiment, the present invention is applied to a five-axis processing machine having three linear axes and two rotary axes. However, the present invention can be applied to a 6-axis processing machine having three rotary axes.

What is claimed is:

1. A method of generating a smooth curve from a commanded sequence of points by a numerical controller for a multi-axis machine tool having three linear axes and two or more rotary axes to perform interpolation along the generated curve, comprising:

calculating interpolation points between points of a commanded sequence of points and setting the calculated interpolation points as geometrical command points;

noticing respective points of the geometrical command points one by one so as to select a noticed point and geometrical command points located before and behind the noticed point, wherein the number of geometrical command points has been decided in advance;

resolving each of the geometrical command points into a component of three linear axes and a component of two or more rotary axes;

generating an approximated curve for linear axes with regard to the component of three linear axes;

moving the component of three linear axes toward the approximated curve for linear axes so as to obtain corrected command point for the linear axes;

generating an approximated curve for rotary axes with regard to the component of two or more rotary axes;

moving the component of two or more rotary axes toward the approximated curve for rotary axes so as to obtain corrected command point for rotary axes;

synthesizing the component of three linear axes of the corrected command point for the linear axes which has been moved and the component of two or more rotary axes of the corrected command points for rotary axes which has been moved so as to obtain a synthesized corrected command point;

repeating the noticing, resolving, generating, moving, generating, moving, and synthesizing with regard to the respective geometrical command points;

generating a curve passing through a point sequence of the synthesized corrected command points; and interpolating the generated curve.

2. The curve interpolating method according to claim 1, wherein in the calculating, the interpolation points and the commanded sequence of points are collectively set as geometrical command points.

3. The curve interpolating method according to claim 1, wherein in the calculating, interpolation points are calculated at a density higher than a set unit of point sequence command, when carrying out interpolation.

4. The curve interpolating method according to claim 1, wherein in the generating an approximated curve, an approximated curve is generated such that a sum of squares of distances between respective points and the approximated curve is minimum.

5. The curve interpolating method according to claim 1, wherein in the moving, when a movement amount for correction exceeds a first set value, the movement amount for correction is set to said first set value.

6. The curve interpolating method according to claim 1, wherein in the moving, when a distance between corrected command points is smaller than a second set value, an interpolation point between the corrected command points is set as a corrected command point, and the corrected command points used for calculating the interpolation point are deleted.

7. The curve interpolating method according to claim 6, wherein the interpolation point is a median point.

8. The curve interpolating method according to claim 1, wherein in the moving, the components are moved at a density higher than a set unit of point sequence command.

9. The curve interpolating method according to claim 1, wherein in the generating a curve, when generating a curve passing through the synthesized correction commanded sequence of points, a synthesized first-order derivative value is used, the synthesized first-order derivative value being obtained by calculating, for each of the corrected command points, first-order derivative values of an approximated curve at the points on the approximated curve to which respective corrected command points on the approximated curve for linear axes and the approximated curve for rotary axes correspond, and synthesizing the calculated first-order derivative values.

10. The curve interpolating method according to claim 1, wherein in the interpolating, interpolation is performed at a density higher than a set unit of point sequence command.

11. The curve interpolating method according to claim 1, wherein in the calculating, when a distance between command points is smaller than a certain set value, an interpolation point between the command points is regarded as a command point, and the command points used for calculating the interpolation point are deleted.

12. The curve interpolating method according to claim 11, wherein the interpolation point is a median point.

13. The curve interpolating method according to claim 1, wherein in the generating an approximated curve, a curve to be generated is an NURBS curve.

14. The curve interpolating method according to claim 1, wherein in the generating an approximated curve, a curve to be generated is a spline curve.

* * * * *

UNITED STATES PATENT AND TRADEMARK OFFICE
CERTIFICATE OF CORRECTION

PATENT NO. : 7,274,969 B2  
APPLICATION NO. : 11/414170  
DATED : September 25, 2007  
INVENTOR(S) : Toshiaki Otsuki et al.

It is certified that error appears in the above-identified patent and that said Letters Patent is hereby corrected as shown below:

Sheet 7 of 7 (Left hand side) (FIG. 14), Line 1, change "$Q_{j-i}$" to --$Q_{j-1}'$--.

Column 7, Line 29, change "$Q_0'$ command" to --$Q_0'$=command--.

Column 9, Line 52, before "and" delete "generating, moving,". (Second Occurrence)

Signed and Sealed this

Twenty-ninth Day of April, 2008

JON W. DUDAS  
*Director of the United States Patent and Trademark Office*